US006536662B1

(12) United States Patent
Ohno

(10) Patent No.: US 6,536,662 B1
(45) Date of Patent: Mar. 25, 2003

(54) AUTOMATIC TRANSACTION APPARATUS AND CONTROL METHOD

(75) Inventor: Seiich Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/477,404

(22) Filed: Jan. 4, 2000

(30) Foreign Application Priority Data

Jan. 6, 1999 (JP) .......................................... 11-153659

(51) Int. Cl.[7] .............................................. G06F 17/60

(52) U.S. Cl. ...................... 235/379; 235/380; 235/382; 235/385; 235/475; 235/477

(58) Field of Search ................................ 235/379, 380, 235/382, 375, 475, 477

(56) References Cited

U.S. PATENT DOCUMENTS 4,660,168 A * 4/1987 Grant et al. ................ 364/900
4,914,476 A * 4/1990 Nishitsuji et al. ........... 219/216
4,988,854 A * 1/1991 Mita .......................... 235/476
5,141,127 A * 8/1992 Graef et al. ................... 221/4
5,626,822 A * 5/1997 Kadowaki et al. ...... 235/379 X
5,719,383 A * 2/1998 Forrest ....................... 235/379
6,019,210 A * 2/2000 Matsunaga et al. ......... 194/206
6,032,858 A * 3/2000 Yazumi et al. .............. 235/379
6,061,666 A * 5/2000 Do et al. ................ 235/379 X

FOREIGN PATENT DOCUMENTS

| | | |
|---|---|---|
| JP | 2-44491 | 2/1990 |
| JP | 02284353 | * 10/1990 |
| JP | 6-290200 | 10/1994 |
| JP | 6-329300 | 11/1994 |
| JP | 9-282520 | 10/1997 |

* cited by examiner

*Primary Examiner*—Karl D. Frech
*Assistant Examiner*—Daniel Walsh
(74) *Attorney, Agent, or Firm*—Staas & Halsey LLP

(57) ABSTRACT

An automatic transaction apparatus, having a processing part handles transaction information and transaction medium, a conveyer part which conveys the transaction medium corresponding to the transaction information, a temperature sensor measuring a temperature of the conveyer part and a controller connected with the temperature sensor, the controller controlling a conveyed speed of the transaction medium and an interval to dispense the transaction medium by the conveyer part in accordance with a temperature measured by the temperature sensor.

14 Claims, 6 Drawing Sheets

AUTOMATIC TRANSACTION APPARATUS AND CONTROL METHOD

BACKGROUND OF THE INVENTION

The present invention generally relates to automatic transaction apparatuses, and more particularly to an automatic transaction apparatus comprising a conveyor mechanism for mechanically conveying a transaction medium. The present invention is suitable for an automatic teller machine ("ATM"), a cash dispenser ("CD") and an automatic depository ("AD"), for example.

The automatic transaction apparatus is such a system that receives and/or dispenses, etc. one or more transaction media (such as bills, coins, cards, train tickets, admission tickets, stock certificates and other securities, pari-mutuel tickets, lottery tickets, goods and medical treatment cards) in accordance with transaction information entered by a user. Although the automatic transaction apparatus in this application broadly covers an automatic money loan machine, an automatic card issuance machine and an automatic tab output device, etc., the most typical example is an ATM provided in a financial institution like a bank, etc.

The ATMs are expected to be provided hereafter in various places without limited to anywhere in a financial institution and to offer services to customers (users) on an around-the-clock basis.

The ATM comprises a conveyer part that contacts a transaction medium such as a bill (optionally with a coin), a bankbook, a card and a transaction statement slip, etc., and conveys the same between a front cover (which is generally called "facade") of an ATM housing and varied kinds of processing parts by utilizing a frictional force. The conveyer part comprises a dispenser part that dispenses bills out of a stack when money is to be withdrawn. The conveyer part, which is typically driven mechanically by a motor, comprises a conveyer belt or a dispensing roller made of rubber, etc. The ATM is expected to quickly handle transactions such as of depositing money, withdrawing money, entering the transaction on a bankbook and wire-transferring money, etc.; therefore, each ATM manufacturer has run a simulation and set a most suitable rotational speed of a motor common to (or alternatively according to) each process.

As may be understood, however, a place in which the ATM is provided may not have such a temperature environment as a simulation room of manufacturer, and the ATM has a metal housing in particular with high thermal conductivity, which is sensitive to the external temperature. Rubber or the like which constitutes an element of the conveyer part is generally cured by a drop in temperature. The extent of its cure may depend upon a kind of rubber or the degree of drop in temperature, etc., but no matter how little the cure proceeds, the cure certainly makes the frictional coefficient lower. As a result, the friction forces, for example, between the conveyer belt and a bill, and between the dispensing roller and a bill decrease, whereby the bill slips out of or inclines relative to a conveying route, causing a jam when conveyed or dispensed.

Further, a motor as a driving source generally reduces the torque as the temperature drops, and therefore, may cause an ununiformed rotation or a startup error at a low temperature. The ununiformed rotation or startup error may prevent a stable conveyance or dispensing, and may cause a jam.

In winter when the temperature lowers (especially in Japan), air becomes dry and static electricity is likely. For instance, when a bill reaches an entrance of a storing part, it is released from the conveyer belt, thereafter falling at a storing position in the storing part and getting aligned. Electrostatic repulsion generated between the bill and the stored bills can cause a jam during the storing step.

Such a jam causes the ATM services to be suspended and inconveniences not only the pertinent customer but also all the customers waiting behind him in a queue. Particularly, if the ATM that operates an around-the-clock suffers from the jam after hours when no ATM maintenance person is available, users are put to great inconvenience.

Such a cold environment is not limited to a cold district but are common, for example, early in the morning in winter. An ATM in the corner of a bank is generally equipped with a heater, but many temperature adjusting devices are turned off at night. Therefore, operated in the early morning, the conveyer systems in the ATM are in a low-temperature state.

To solve these problems, it is conceivable to mount in the ATM a heater that would heat the housing when the external temperature lowered or to mount an electrostatic remover therein, but they would result in a larger and more expensive ATM.

BRIEF SUMMARY OF THE INVENTION

Accordingly, it is a general object of the present invention to provide a novel and useful automatic transaction apparatus and a control method thereof in which the above disadvantages are eliminated.

More specifically, it is an exemplified object of the present invention to provide an automatic transaction apparatus capable of stably conducting transactions even in a low-temperature and/or charged environment and a control method thereof.

In order to achieve the above object, an automatic transaction apparatus as an exemplified embodiment of the present invention comprises a housing, an entry part provided in the housing for receiving transaction information and/or a transaction medium, a processing part which is provided in the housing and handles the transaction information arid transaction medium, a conveyer part which is provided in the housing and conveys the transaction medium corresponding to the transaction information in a mode selected from plural operation modes, a temperature sensor measuring a temperature of the conveyer part, and a controller provided in the housing for connected with the temperature sensor, controlling the conveyer part and switching the operation mode in accordance with a temperature measured by the temperature sensor. According to the inventive automatic transaction apparatus, a controller controls an operation of the conveyer part according to the temperature.

An initial operation control method for an automatic transaction apparatus as an exemplified embodiment of the present invention comprises the steps of activating the automatic transaction apparatus which carries out transactions utilizing a transaction medium according to transaction information, measuring a temperature of a conveyer part capable of conveying the transaction medium, running idle the conveyer part at a first speed when the temperature of the conveyer part is higher than a predetermined temperature, and running idle the conveyer part at a second speed lower than the first speed when the temperature of the conveyer part is lower than the predetermined temperature. According to the method, the automatic transaction apparatus runs at idle at a low speed in the initial operation when at low temperature.

An initial operation control method for an automatic transaction apparatus as another exemplified embodiment of the present invention comprises the steps of activating a power supply to the automatic transaction apparatus which carries out transactions utilizing a transaction medium according to transaction information, measuring a temperature of a conveyer part capable of conveying the transaction medium, running idle the conveyer part for a first period when the temperature of the conveyer part is higher than a predetermined temperature, running idle the conveyer part for a second period longer than the first period when the temperature of the conveyer part is lower than the predetermined temperature. According to this method, the automatic transaction apparatus runs idle for a long period in the initial operation when at low temperature.

A control method of an automatic transaction apparatus as an exemplified embodiment of the present invention is a control method of the automatic transaction apparatus comprising a housing, an entry part provided in the housing and receiving transaction information and/or a transaction medium, a processing part which is provided in the housing and handles the transaction information and transaction medium, and a conveyer part which is provided in the housing and conveys the transaction medium corresponding to the transaction information in a mode selected from plural operation modes, the control method comprising the steps of measuring a temperature of the conveyer part, and switching the operation mode according to the measured temperature. According to this control method, the controller controls a conveyer part according to the temperature.

Other objects and further features of the present invention will become readily apparent from the following description and accompanying drawings.

DETAILED DESCRIPTION OF THE INVENTION

Figure 1:
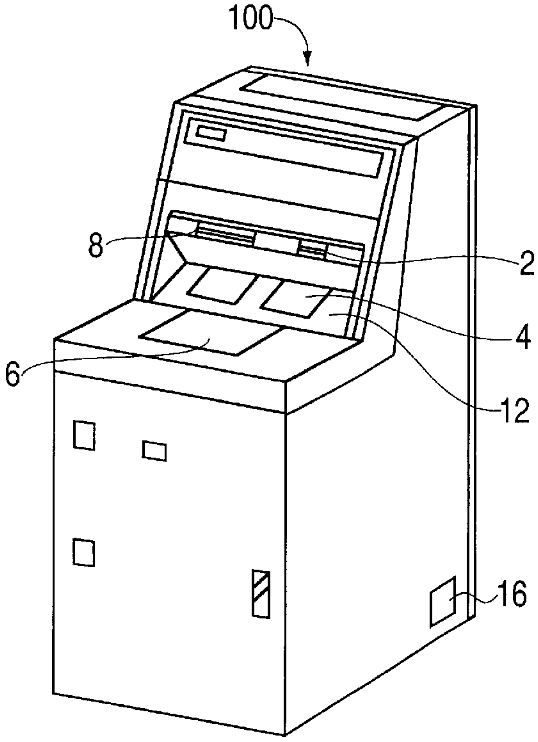
FIG. 1 is a perspective overview of an exemplified ATM of the present invention.
Figure 2:
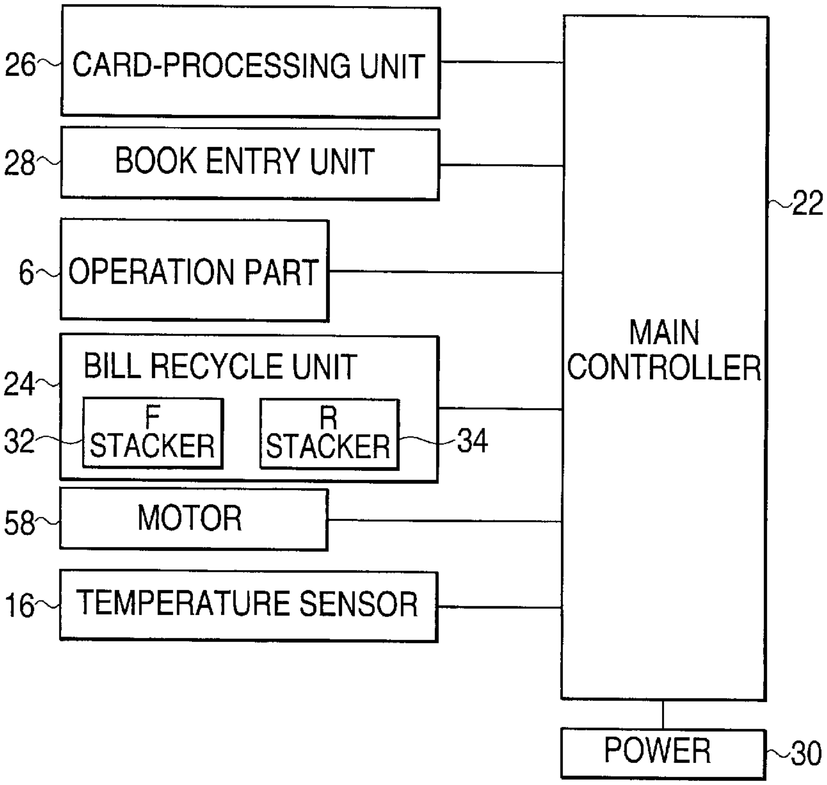
FIG. 2 is a schematic block diagram of a control system of the ATM shown in FIG. 1.

Referring now to FIGS. 1 and 2, a description will be given of an ATM as an exemplary embodiment of an automatic transaction apparatus of the present invention. The same members are indicated with the same reference numerals, and a duplicate description thereof will be omitted. FIG. 1 is a perspective overview of the ATM 100 of the present invention. FIG. 2 is a schematic block diagram of a control system of the ATM 100 shown in FIG. 1.

The ATM 100 shown in FIG. 1 includes a metal housing 12 having a high thermal conductivity, a card slot 2, a dedicated bill mouth 4, an operation part 6, a bankbook slot 8, and a temperature sensor 16. The ATM 100 further includes inside, as shown in FIG. 2, a main controller 22, a bill recycle unit ("BRU") 24 which is connected with and controlled by the main controller 22, a card-processing unit 26, a book entry unit 28, a motor 58 and a power supply 30. The motor 58 generalizes a drive source for conveyer systems for all transactional media including not only bills, but bankbooks, cards, etc as a matter of convenience. The ATM 100 can carry out various transactions such as a deposit, a withdrawal, a transfer and commutation, a book entry, a balance check, etc.

The card slot 2 is connected with the card-processing unit 26 shown in FIG. 2. The bankbook slot 8 is connected with the book entry unit 28 shown in FIG. 2. The book entry unit 28 may print a past transactional history on a bankbook a user has inserted. The dedicated bill mouth 4, which is connected with the BRU 24 shown in FIG. 2, serves as an interface where a user withdraws and deposits bills. The BRU 24 comprises a ¥10,000 bill-storing unit (F stacker) 32 that stores 10,000-yen bills and a ¥1,000 bill-storing unit (R stacker) 34 that stores 1,000-yen bills. The operation part 6 can display information on an operation required for a transaction and enables a user to enter necessary information. The operation part comprises, for example, a liquid crystal touch panel screen. Transactional information entered by a user such as card's PIN information, bankbook information or the like is transmitted to the main controller 22.

The main controller 22 includes a processing device like a CPU or an MPU, which manipulates a variety of transactional information. The main controller 22 further includes, or is connected with, a volatile and/or nonvolatile memory used for control operations. The main controller 22 still further includes, or is connected with, a communication part (not shown) through which it may communicate with a financial institute which issued the card. Moreover, the main controller 22 can determine the kind and the number of bills that has been deposited or is to be withdrawn, display an amount of bills that has been deposited on the operation part 6, and issue a transactional statement slip when a transaction is completed. The main controller 22, as will be described later, may change an operation mode (speed, dispensing intervals, etc.) for the conveyer systems based upon an output from the temperature sensor 16. In addition, the main controller 22 includes, or is connected with, a timer that recognizes whether a predetermined time has passed since a shutter of the dedicated bill mouth 4 opened in a withdrawal transaction, which will be described later.

A bankbook, bill and card are conveyed with a conveyer belt driven by a drive force obtained from the motor 58 mounted inside the apparatus. The operation of the motor 58 is controlled by the main controller 22, which is turned on and off by the main power supply 30.

The temperature sensor 16 is, as shown in FIG. 1, attached to an outer surface of the housing 12 to continuously measure the surrounding environmental temperature. Although the temperature sensor 16 is provided on an outer surface of the housing 12 because this embodiment assumes, as will be described later, that the temperature of the conveyer systems is the external temperature, the place to be measured is not limited to this position as will be explained later. The temperature sensor 16 may employ various kinds of sensors known in the art, e.g., a current-output-type integrated semiconductor temperature sensor, which outputs a current in a unit of $\mu$A equal to a value indicated by the absolute temperature K. Other examples of the temperature sensors may include a metal temperature-measuring resistor, a thermistor, etc.

As shown in FIG. 2, the temperature sensor 16 is connected with the main controller 22. The main controller 22 receives temperature information output as a current from the temperature sensor 22, and controls the operation of the motor 58 based upon this temperature information. Accordingly, the controller 22 stores in a memory (not shown) charts and tabular lists indicating a current-temperature relationship which shows temperature information, and utilizes the same to detect a temperature from output of the temperature sensor 16. As the above charts, etc. are known in the art, further specific explanations will be omitted. The main controller 22 also includes or is connected with a comparator that compares a temperature detected in a memory (not shown) with a predetermined temperature. Alternatively, the main controller 22 stores software for such comparison in a memory (not shown). Since such software can easily be produced by those skilled in the art from the disclosure of the present application, a detailed explanation thereof will be omitted.

The ATM 100 is illustrated in FIG. 1 as a so-called lobby-type but as a matter of course, the present invention is applicable to a so-called through-the-wall ATM. The through-the-wall ATM has a facade solely exposed outside the wall through which a user performs various transactions and inserts a card, and a remaining part (or a housing body) accommodated inside the wall.

Figure 3:
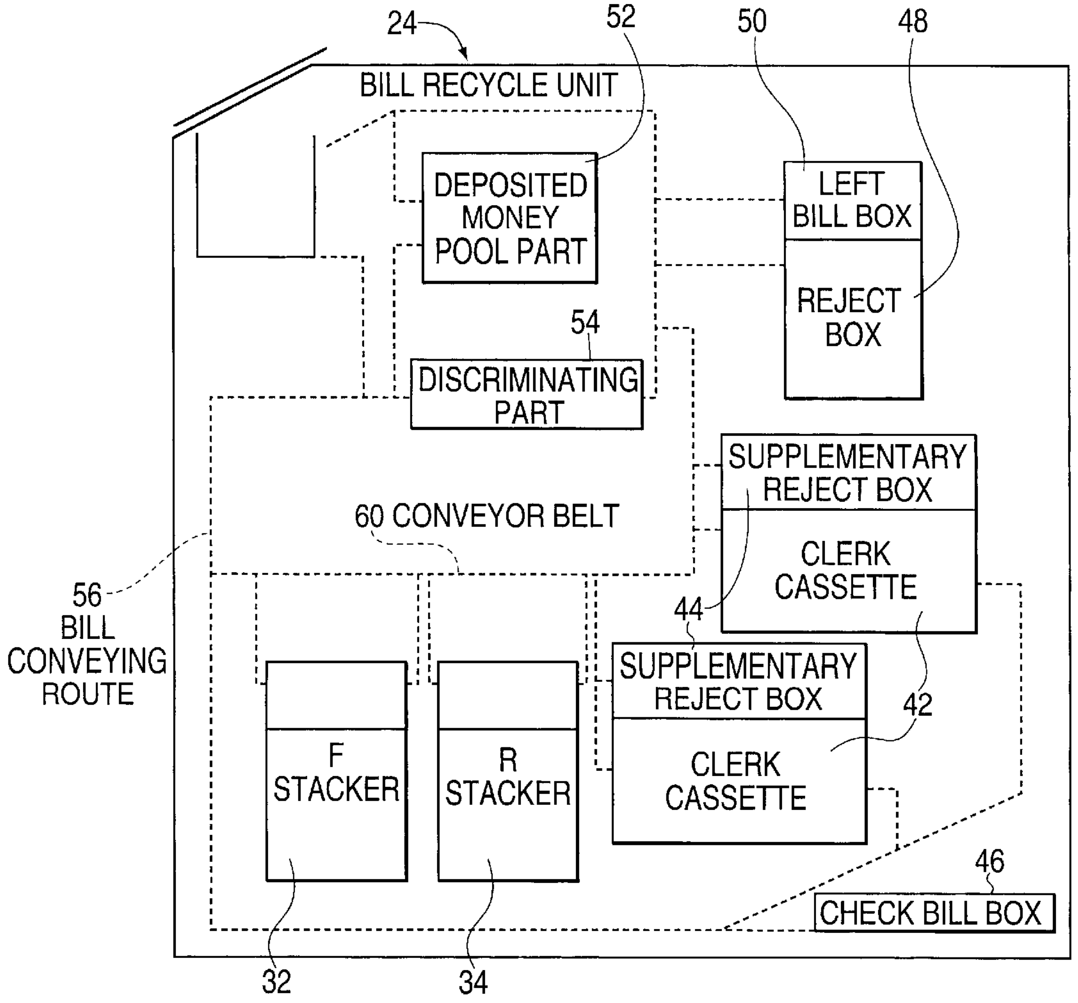
FIG. 3 is a block diagram of a BRU in the ATM shown in FIG. 1.

Referring next to FIG. 3, a description will be given of a detailed inner structure of the BRU 24 to which the present invention is applied. FIG. 3 is a block diagram of the BRU 24 shown in FIG. 2. The card-processing unit 26 and the book entry unit 28 employ the same conveyer belt as the BRU 24, and thus the controlling method of this invention is applicable thereto, but an explanation will now be omitted.

The BRU 24 shown in FIG. 3 includes the F stacker 32, the R stacker 34, a clerk cassette 42, a supplementary reject box 44, a check bill box 46, a reject box 48, a left bill box 50, a deposited money pool part 52, a discriminating part 54 and a bill-conveying route 56. The BRU generally can deposit money as well as withdraw money with transactional information entered by a user, and can discriminate and recycle the deposited money. However, in the BRU 24 of this embodiment, bills to be withdrawn and bills that were deposited are separated, and the deposited bill will never be withdrawn. Regardless, the automatic transaction system of the present invention, needless to say, accepts a BRU of various kinds.

The deposited money pool part 52 temporarily stores (or pools) bills a user has inserted into the dedicated bill mouth 4. The discriminating part 54 can determine whether the bill pooled in the pool part 52 and the bill for withdrawal is normal, and can also determine a kind of and the number of those bills. Hereupon, the "normal bills" denote such bills as having an angle within a prescribed range with respect to the conveying route 56 and such bills as being not forged but genuine. Bills other than normal bills, when deposited, are returned from the discriminating part 54 to the dedicated bill mouth 4.

The F stacker 32 and the R stacker 34 respectively store ¥10,000 bills and ¥1,000 bills. In the present embodiment, as set forth above; bills are not recycled; therefore, no clerk in a financial institution like a bank, etc. sets bills in the F stacker and the R stacker. The clerk cassette 42 stores bills for withdrawal that has been set by a clerk. When bills are sent from the clerk cassette 42 in response to a user's withdrawal request, the discriminating part 54 checks their kind and bills of which the kind has not been determined get stored in the supplementary reject box 44. The clerk cassette 42 shown in FIG. 3 exemplarily comprises an F cassette and an R cassette, but it goes without saying that the number of the cassette is not limited to two.

The check bill box 46 contains mimic bills that may travel the bill-conveying route 56. These bills are used to check whether there is a jam on the conveying route 56. The reject box 48 stores bills that are conveyed to the discriminating part 54 and are determined not to be normal by the discriminating part 54. The left bill box 50 stores bills for withdrawal that a user has failed to take from the dedicated bill mouth 4 within a predetermined time.

The motor 58, the conveyer belt 60 that drives by obtaining a drive force from the motor 58, and rollers (not shown) for transmitting the drive force define the bill-conveying route 56. The motor 58 can drive the rollers to rotate at a plurality of rpms (1.2 m/s, 1.6 m/s, etc.). The rollers include a roller directly engaged with a drive shaft (not shown) of the motor 58, a roller engaged with the above roller, and a bill-dispensing roller arranged near the clerk cassette 42. When deposited bills are attempted to be recycled, a dispensing roller would be mounted near the stackers 32 and 34. The motor 58 can also intermittently drive the dispensing roller. The dispensing interval of the dispensing roller is controllable by the main controller 22.

The motor 58 rotates these rollers by an instruction from the main controller 22. The conveyer belt 60 is looped over the rollers, and is driven according as the roller rotates. Inside the conveyer belt 60 is formed a convexo-concave pattern and the corresponding pattern is also formed on the surface of the roller in order to prevent the roller and the conveyer belt from slipping. Two conveyer belts 60 are, each driven by respective rollers, so provided as are close and opposite to each other. They are driven simultaneously at the same speed. Each bill is sandwiched with these two conveyer belts 60 and conveyed along the conveying route 56 one after another. The conveyer belt 60 is typically a rubber flat belt. As described above, the motor 58 and rollers are omitted in FIG. 3. The above-said conveyer belt 60 and rollers are mainly made of rubber or the like.

A description will now be given of a typical operation of the ATM 100 of the present invention. A low-temperature mode and a normal mode that will be used in the following description are each an example of the operation mode of the ATM 100.

Figure 4:
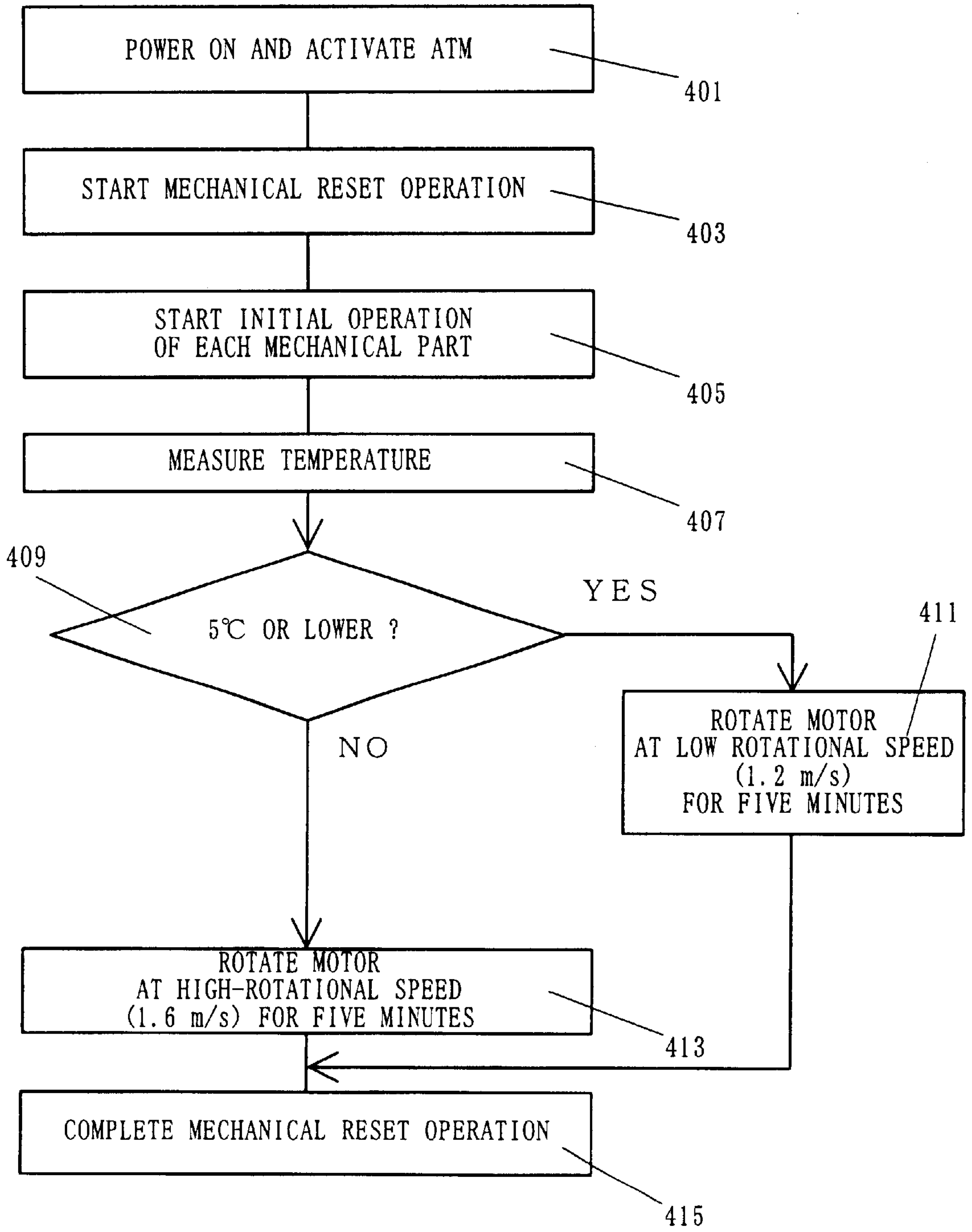
FIG. 4 is a flowchart for explaining an initial check operation procedure of the ATM shown in FIG. 1.

Referring to FIG. 4, a description will be given to a mechanical reset process as an initial operation before starting a normal operation. FIG. 4 is a flowchart for explaining a mechanical reset process. The ATM 100 executes a mechanical reset operation when the power turns on. Alternatively, the ATM 100 may execute a mechanical reset operation at a regular interval. Particularly, the ATM implementing an around-the-clock operation is preferably required to execute a mechanical reset operation not only when the power turns on but also at a regular interval.

First, a clerk turns on the power 30 in the ATM 100 (step 401), and sets the ATM 100 in an operable state. The ATM 100 that has already been powered up but is in a standby state is also set in an operable state. In response thereto, a mechanical reset operation is started (step 403). It is needless to say that the steps 401 and 403 may be combined to one process when a mechanical reset operation is linked to the turning-on of the power and automatically executed. The mechanical reset operation may exemplarily reset a variety of transactional figures (the deposit amount, etc.) to zero and each component of the ATM 100 to each predetermined position. Next, each mechanical part starts an initial operation (step 405). The initial operation is a part of mechanical reset operation and an operation for checking whether each part can operate properly in a normal operation of the ATM 100. For instance, a pressure sensor, a storage sensor or a guide sensor (all not shown) judges whether the predetermined number of bills is appropriately set in the clerk cassette 42. The initial operation may exemplarily turn on a necessary light, check a stock of transaction statement slips, check ink to print on a bankbook or a transaction statement slip, perform a trial conveyance by utilizing the check bill box 46 or otherwise.

The mechanical reset operation includes an operation check of the conveyer systems. Characteristically, the mechanical reset operation of the present embodiment changes its operation mode according to the temperature. Conventionally, the operation mode has not been changed according to the temperature; therefore, the operation mode of the conveyer systems has been determined in a manufacturer's simulation room, which is typically at the normal temperature, for only seeking high-speed operation of the ATM. However, the motor 58 generally reduces the torque as the temperature drops, and thus may cause an ununiformed rotation or a startup error at a low temperature. Moreover, rubber or the like, which constitutes the conveyer belt 60 or the rollers, is generally cured by a drop in temperature, and driving responsivity to the motor 58 may decrease. Thus, a sudden high-speed driving of the motor 58 may destroy the motor 58. Accordingly, the motor 58 of the present embodiment runs idle for a longer predetermined period and/or at a lower speed than usual, whereby the motor 58 and other components of the conveyer systems are warmed and prevented from destroying. Hereupon, “run idle” means an operation which does not accompany bills or transaction media for use with normal transaction procedures (e.g., withdrawal, deposit, etc.).

The temperature should preferably be an average temperature of the whole conveyer systems, but the outside-air temperature is regarded as a temperature of the conveyer systems in the present invention as the housing 12 is made of metal materials with a high thermal conductivity, and accordingly the air temperature is measured by utilizing the temperature sensor 16. The main controller 22 receives the output indicating temperature information from the temperature sensor 16 and recognizes the external temperature (and the constructive average temperature of the conveyer systems) by utilizing charts and tabular lists stored in the memory (not shown) (step 407). In the present embodiment, the critical temperature at which the operation mode (rotational speed of the motor 58 in this case) should be changed is set to be 5° C., but, needless to say, is not limited to this temperature.

Subsequently, the main controller 22 compares the measured temperature with the critical temperature (5° C.) and thereby judges whether the measured temperature exceeds the critical temperature (step 409). The main controller 22, when judging in the step 409 that the measured temperature is equal to or lower than 5° C., selects a low-temperature mode and rotates the motor 58 at a low-rotational speed (1.2 m/s) for five minutes (step 411). Thereby, the temperature in the motor 58 and other conveyer systems rises, and troubles of the conveyer systems due to the low temperature can be avoided. The main controller 22, when judging in the step 409 that the measured temperature is higher than 5° C., selects a high-temperature mode and rotates the motor 58 at a high-rotational speed (1.6 m/s) for five minutes (step 413). Since it is considered that the number of the days when the step 411 should be selected is generally less than that when the step 413 is selected in a year, in the present embodiment, a high-speed procedure may be selected in step 413 as in the conventional method. The rotational time is set to, but not limited to, five minutes in the steps 411 and 413 in the present embodiment. Thereafter, the mechanical reset operation is completed (step 415).

Figure 5:
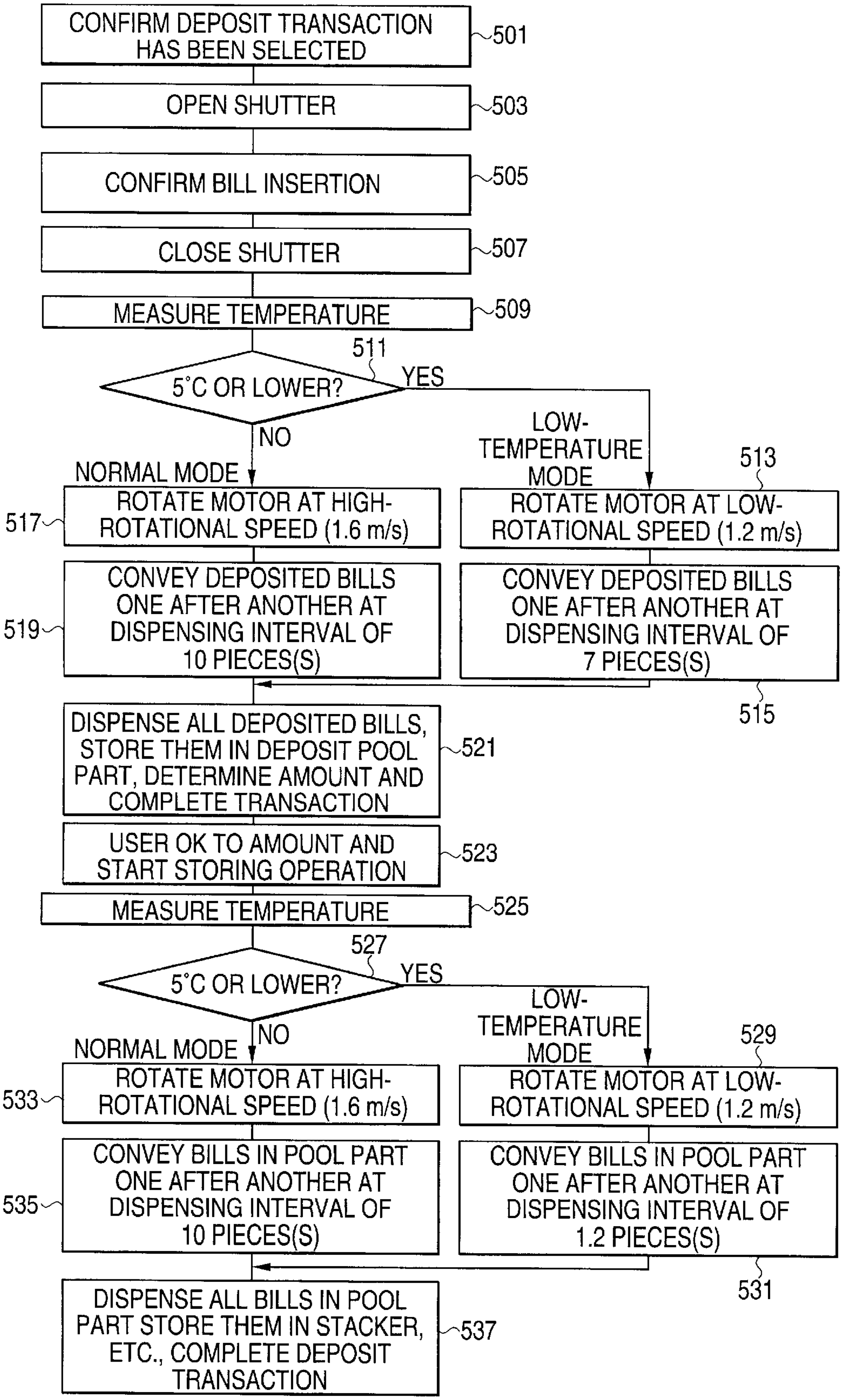
FIG. 5 is a flowchart for explaining a deposit transaction procedure by the ATM shown in FIG. 1.

Referring to FIG. 5, a description will be given of the deposit transaction procedure by the ATM 100 of the present invention. Hereupon FIG. 5 is a flowchart for explaining the deposit transaction procedure by the ATM 100. First, the main controller 22 confirms that a user has selected the deposit transaction via the operation part 6 (step 501). Before or after this, the main controller 22 reads information on a card the user has inserted into the card slot 2 and a PIN, communicates with a financial institution that issued the card, recognizes user's account, and checks the validity of the PIN by the conventional method.

Next, the main controller 22 opens the shutter (not shown) in the dedicated bill mouth 4, and instructs the operation part 6 to display a prompt to place bills (step 503). When it has confirmed that the user put bills therein from the dedicated bill mouth 4 (step 505), the main controller 22 closes the shutter in the dedicated bill mouth 4 (step 507).

The main controller 22, thereafter, receives the output indicating temperature information from the temperature sensor 16 and recognizes the external temperature (and the constructive average temperature of the conveyer systems) by utilizing charts and tabular lists stored in the memory (not shown) (step 509). Subsequently, the main controller 22 compares the measured temperature with the critical temperature (5° C.) and thereby judges whether the measured temperature exceeds the critical temperature (step 511). The main controller 22, when judging in the step 511 that the measured temperature is equal to or lower than 5° C., selects a low-temperature mode and rotates the motor 58 at a low-rotational speed (1.2 m/s) for five minutes (step 513).

Characteristically, the deposit transaction procedure of the present embodiment changes its operation mode (namely, the rotational speed of the motor 58) according to the temperature. Conventionally, the operation mode has not been changed according to the temperature; therefore, the operation mode of the conveyer systems has been determined in a manufacturer's simulation room, which is typically at the normal temperature. The system is thus optimized for high-speed operation between a user and the ATM. However, the motor generally does not produce as much the torque as the temperature drops. Moreover, rubber or the like, which constitutes the conveyer belt 60 or the rollers, is generally hardened by a drop in temperature. The extent of its hardening may depend upon the kind of rubber or the degree of drop in temperature, etc., but no matter small the increase in hardness, the increased hardness certainly makes the frictional coefficient lower. As the friction force between the conveyer belt 60 and the deposited bill decreases, bills slip out of or become offset relative to a conveying route 56, causing a jam when conveyed the jam can cause the ATM services to be suspended.

Accordingly, the motor 58 in the present embodiment rotates for a longer predetermined period (at a lower speed) than usual, and thereby prevents a slip between the conveyer belt 60 and the bill. Further, the low rotational speed of the motor 58 enables a high rotational torque. Consequently, a jam that might occur when the bills were conveyed from the dedicated bill mouth 4 to the stackers 32 and/or 344 is prevented, and the motor 58 lasts longer.

Next, the main controller 22 slows its dispensing interval (e.g., down to an interval of 7 pieces/sec.) to less than the normal one, and dispenses bills one after another (step 515). Characteristically, the deposit transaction procedure in the present embodiment changes its operation mode (namely, the bill dispensing interval) according to the temperature. Conventionally, the bill conveying interval has not been changed according to the temperature. When the deposited bill is conveyed and reaches an entrance of the F stacker 32 and R stacker 34, they are expected to be released from the conveyer belt 60 and become free, thereafter falling at a storing position of each stacker and getting placed in a proper alignment. However, in winter when the temperature lowers (especially in Japan), an air becomes dry and a static electricity is likely to generate, whereby an electrostatic repulsion when generated between the bill which is to be stored and that which has been stored causes a jam during the storing step. Further, a collision of the bill when dispensing the bill from the dedicated bill mouth 4 causes a jam too. Accordingly, in the present embodiment, the bill dispensing interval is expanded when at the low temperature, and thereby gains time to calm electrostatic disorder and prevents bill from colliding when dispensing, thereby preventing a jam.

The main controller 22, when judging in the step 511 that the temperature in the conveyer systems is higher than the critical temperature, selects a normal mode, rotates the motor 58 at a high-rotational speed (1.6 m/s)(step 517), dispenses and conveys the deposited bill one after another at a dispensing interval of 10 pieces/sec. (step 519). Since it is considered that the number of the days when the low-temperature mode should be selected is generally less than that when the normal mode is selected in a year, in the present embodiment, a high-speed procedure may be selected in steps 517 and 519 as in a conventional method. The speed and dispensing interval in the steps 511 through 519 are exemplary only, and, needless to say, are not limited to the above values.

In both the low-temperature and normal modes, when the deposited normal bills are stored in the deposit pool part 52 and the amount of money is determined, the deposit transaction procedure is completed (step 521). That is to say, the discriminating part 54 judges whether a bill which has passed the discriminating part 54 is normal, and if judging that it is not normal, transmits that to the main controller 22. In response, the main controller 22 returns the bill to the dedicated bill mouth 4. On the other hand, the discriminating part 54, if judging that the bill is normal, transmits the fact, the kind and number of the bills to the main controller 22. In response, the main controller 22 instructs the operation part 6 to display a prompt to confirm whether or not the amount the discriminating part 54 has detected is correct, and upon confirmation by the user, starts a storing operation (step 523).

The main controller 22 receives the output indicating temperature information from the temperature sensor 16 and recognizes the external temperature (and constructive average temperature of the conveyer systems) by utilizing charts and tabular lists stored in the memory (not shown) (step 525). Subsequently, the main controller 22 compares the measured temperature with the critical temperature (5° C.) and thereby judges whether the measured temperature exceeds the critical temperature (step 527). Since these steps are the same as the steps 509 and 511, the steps 525 and 527 may be omitted using the result of these steps.

The main controller 22, when judging in the step 527 that the temperature in the conveyer systems is 5° C. or lower, selects a low-temperature mode, rotates the motor 58 at a low-rotational speed (1.2 m/s)(step 529), and conveys a bill in the deposit pool part 52 by dispensing the same one after another at a dispensing interval of 7 pieces/sec. (step 531). The main controller 22, when judging in the step 527 that the temperature in the conveyer systems is higher than the critical temperature, selects a normal mode, rotates the motor 58 at a high-rotational speed (1.6 m/s)(step 533), and conveys a deposited bill by dispensing the same one after another at a dispensing interval of 10 pieces/sec. (step 535).

In both the low-temperature and normal modes, when the all the bills in the deposit pool part 52 are stored in the F stacker 32 and/or the R stacker 34, the deposit transaction procedure is completed (step 537).

Figure 6:
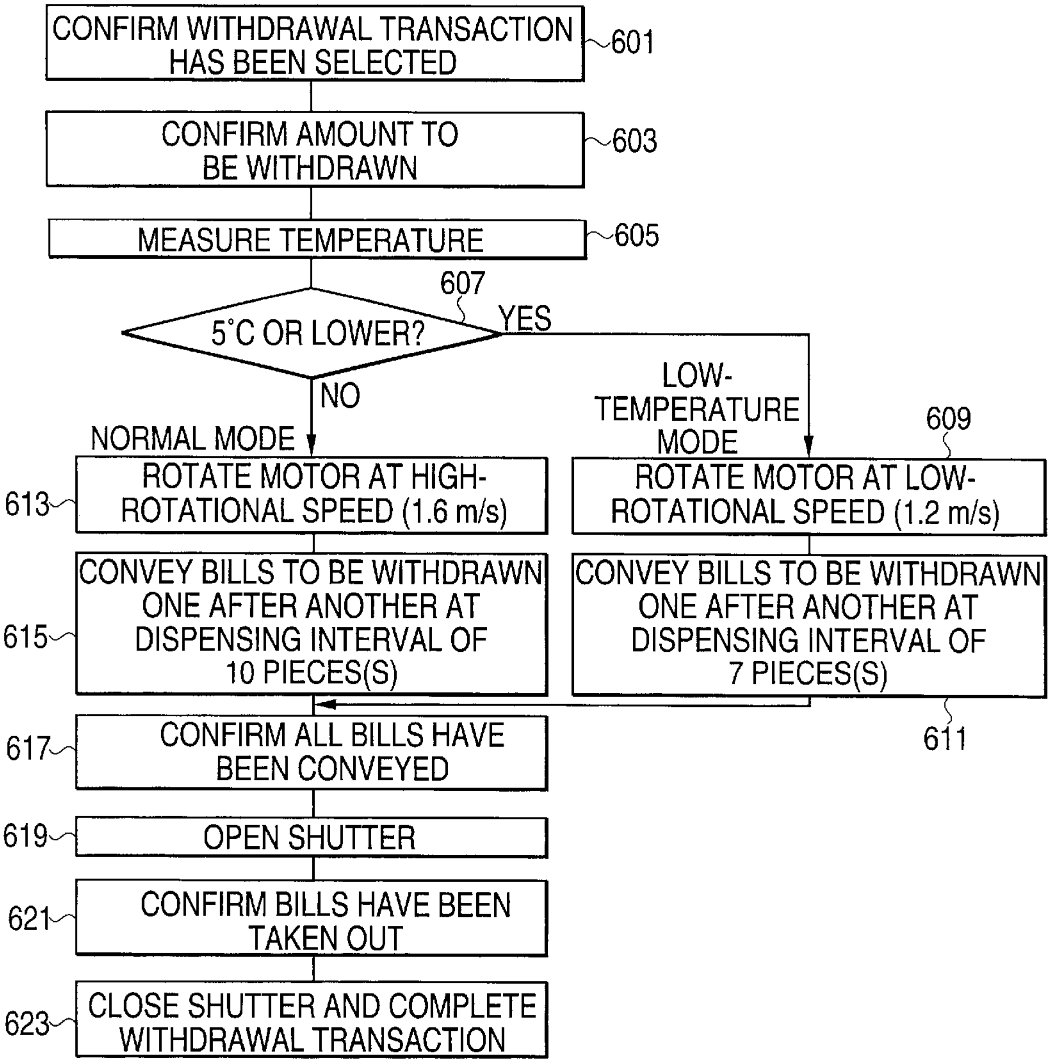
FIG. 6 is a flowchart for explaining a withdrawal transaction procedure by the ATM shown in FIG. 1.

A description will next be given of the withdrawal transaction procedure of the ATM 100 of the present invention with reference to FIG. 6. FIG. 6 is a flowchart for explaining the withdrawal transaction procedure by the ATM 100. First, the main controller 22 confirms that a user has selected the withdrawal transaction via the operation part 6 (step 601). Before or after this, the main controller 22 reads information on a card the user has inserted into the card slot 2, and a PIN. Further, the main controller confines the amount of money to be withdrawn the user inputs (step 603). The main controller 22 thereafter transmits information on the card, the PIN and the amount of money to be withdrawn to a financial institution, recognizes the user's account, and checks the validity of the PIN by a conventional method. The main controller 22 counts the kinds and numbers of bills relevant of the amount of money to be withdrawn and conveys the bills to the dedicated bill mouth 4 without waiting for the check result to expedite the transaction procedure.

Next, the main controller 22 receives the output indicating temperature information from the temperature sensor 16 and recognizes the external temperature (and the constructive average temperature of the conveyer systems) by utilizing charts and tabular lists stored in the memory (not shown) (step 605). Subsequently, the main controller 22 compares the measured temperature with the critical temperature (5° C.) and thereby judges whether the measured temperature exceeds the critical temperature (step 607). The main controller 22, when judging in the step 607 that the measured temperature is equal to or lower than 5° C., selects the low-temperature mode and rotates the motor 58 at a low-rotational speed (1.2 m/s) for five minutes (step 609).

Characteristically, the withdrawal transaction procedure of the present embodiment changes its operation mode (namely, the rotational speed of the motor 58) according to the temperature. In the withdrawal transaction procedure as well as the deposit transaction procedure, the performance of the motor 58 and the conveyer belt 60 lowers when at a low temperature. In addition, the dispensing roller that is used for dispensing a bill from the clerk cassette 42 is also made of rubber, etc. like the conveyer belt 60, so that the low friction force due to a low temperature lowers dispensing performance. For that reason, in the withdrawal transaction procedure, a jam is likely to occur not only during the conveying step but also during the dispensing step.

Accordingly, the motor 58 in the present embodiment when at a low temperature rotates for a longer predetermined period (namely, at a lower speed) than when at a normal temperature, and is thereby prevented from producing a slip between the conveyer belt 60 and the bill. Further, the low rotational speed of the motor 58 enables a high rotational torque. Consequently, a jam that might occur when bills were conveyed from the clerk cassette 42 to the dedicated bill mouth 4 is prevented and the motor 58 is prevented from destroying.

Next, the main controller 22 retards its dispensing speed (e.g., down to an interval of 7 pieces/sec.) lower than the normal one, and dispenses bills to be withdrawn one after another from the clerk cassette 42 (step 611). Characteristically, the withdrawal transaction procedure in the present embodiment changes its operation mode (namely, the bill dispensing interval) according to the temperature. This may prevent a collision of the bill when dispensing the bill and the electrostatic repulsion of the bill in the dedicated bill mouth 4; thereby prevents a jam.

The main controller 22, when judging in the step 607 that the temperature in the conveyer systems is higher than the critical temperature, selects a normal mode, rotates the motor 58 at a high-rotational speed (1.6 m/s)(step 613), and dispenses and conveys by the deposited bill one after another at dispensing interval of 10 pieces/sec. (step 615). Since it is considered in Japan that the number of the days when the low-temperature-mode should be selected is generally less than that when the normal mode is selected in a year, in the present embodiment, a high-speed procedure may be selected in steps 613 and 615 as in a conventional method. The speed and dispensing interval in the steps 607 through 615 are exemplary only, and, needless to say, are not limited to the above values.

Next, the discriminating part 54 checks the kind of bills that have been dispensed. Those bills of which the kind cannot be determined are stored in the supplemental reject box 44. Those bills of low quality as crumpled, torn or otherwise are stored in the reject box 48. In both the low-temperature and normal modes, the main controller 22 checks whether all bills equivalent to the amount of money to be withdrawn have been conveyed to the dedicated bill mouth 4 (step 617). The main controller 22, after receiving approval from a financial institution, opens the shutter of the dedicated bill mouth 4 (step 619).

The main controller 22 thereafter confirms that the user has taken out the withdrawn bills from the dedicated bill mouth 4 (step 621), closes the shutter of the dedicated bill mouth 4 (step 623), and completes the withdrawal transaction procedure (step 625). If a predetermined time has passed while the user fails to take bills, the bills left behind are stored in the left bill box 50. The main controller 22, unless having received approval from a financial institution, instructs the operation part 6 to display the fact. In response, the user may choose to reenter the PIN or the amount of money to be withdrawn, or to complete the transaction procedure. As this procedure is known in the art, a further explanation in detail will be omitted.

Figure 7:
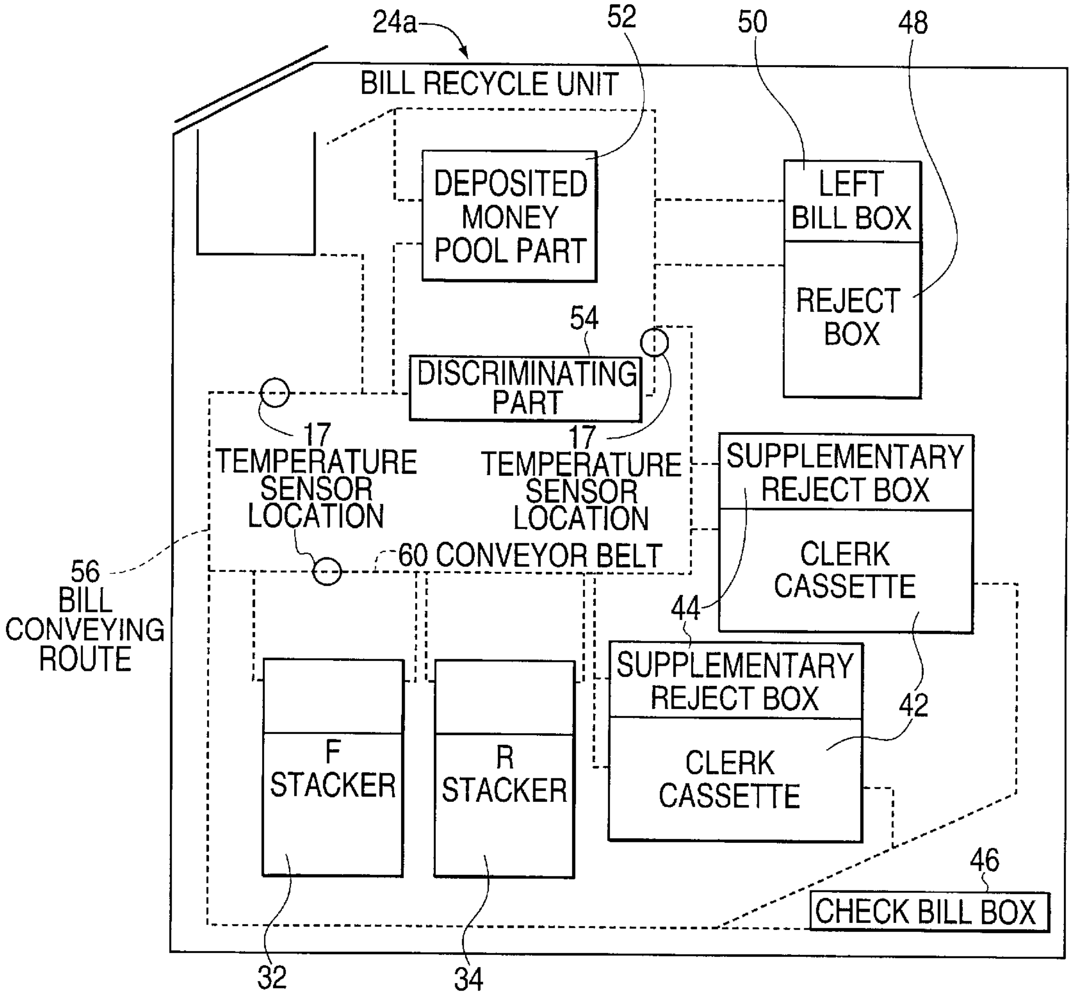
FIG. 7 is another block diagram of a BRU in the ATM shown in FIG. 1.

Despite these aforementioned embodiments of the present invention, it is believed obvious that the present invention is not limited to the specific embodiments thereof and various modifications and changes may be made in the present invention without departing from the spirit and scope thereof. For instance, although the temperature sensor 16 is, as shown in FIG. 1, attached on the outer surface of the housing 12 and indirectly measures the temperature of the conveyer systems, it may directly measure the temperature of the conveyer systems. Continuous driving of the motor 58 and the conveyer belt 60, etc. raises the temperature, but in the transaction procedure as shown in FIGS. 4 through 6, if the external temperature is lower than the critical temperature, regardless of the internal temperature, a low-temperature mode would be always selected. In order to avoid such inconveniences, the BRU 24 shown in FIG. 3 may be replaced by the BRU 24*a* shown in FIG. 7. The BRU 24*a* has temperature sensors 16 at three locations 17. The temperature of the conveyer systems may be indicated as an average value obtained from these three temperature sensors 16. These three locations 17 may be determined for example by simulation to level the variations of temperature, but are exemplary only and, needless to say, are not limited to the illustrated. For example, if the dispensing roller provided near the stackers 32 and 34 is likely to suffer a jam, the temperature sensor 16 may independently be attached near the dispensing roller. The temperature sensors may be attached both inside and outside the housing 12 and the outputs from the both sensors may be utilized in association.

The present invention may not only be applied to the BRU 340 but also to a Bill Dispense Unit ("BDU") or an Envelope Depository Unit ("EDU"). The BDU is a dedicated withdrawal unit which dispenses a bill equivalent to the withdrawal amount in response to a user entering predetermined transactional information, such as a card and a PIN, a withdrawal amount, etc. The EDU is a dedicated deposit unit that handles a deposit amount in response to a user entering transactional information and inserting an envelope enclosing bills to be deposited.

Furthermore, the present invention is broadly applied to an automatic transaction device, and is not limited to an ATM.

According to the automatic transaction apparatus and controlling method thereof as an exemplified embodiment of the present invention, an operation of the conveyer part is controlled according to the temperature; therefore, when the operation performance (or the conveying capability) of the conveyer part lowers at a low temperature, the assurance of the conveyance may be allowed to take precedence over the conveyance speed. This makes it possible to provide an automatic transaction apparatus which maintains a stable transaction operation even in a low-temperature environment, reducing the frequency of suspension of the automatic transaction apparatus, and makes it possible to provide services continuously to users. According to the method of controlling an initial operation of the automatic transaction apparatus as an exemplified embodiment of the present invention, in the initial operation of the automatic transaction apparatus, the idling speed is low or idling time is long at a low temperature. Therefore, the automatic transaction apparatus can prevent its breakdown in its initial operation.

What is claimed is:

1. An automatic transaction apparatus, comprising:

a processing part which handles transaction information and transaction medium;

a conveyer part which conveys said transaction medium one by one corresponding to said transaction information;

a dispensing part that dispenses the transaction medium to the conveyer part;

a temperature sensor measuring a temperature of said conveyer part; and a controller connected with said temperature sensor, said controller independently controlling a conveyed speed of the transaction medium by said conveyer part and an interval to dispense the transaction medium one by one by said dispensing part in accordance with a temperature measured by said temperature sensor.

2. An automatic transaction apparatus according to claim 1, wherein said conveyer part comprises:

a driven part which is engaged with and conveys said transaction medium; and a driving part which drives said driven part and has a first speed and a second speed lower than said first speed, wherein said controller instructs said driving part to drive said driven part at said first speed when the temperature measured by said temperature sensor is higher than a predetermined temperature, and at said second speed when the temperature measured by said temperature sensor is lower than said predetermined temperature.

3. An automatic transaction apparatus according to claim 1, wherein said transaction medium has a paper form, said conveyer part conveys said transaction medium one after another, said automatic transaction apparatus further comprises a storing part which stores said transaction medium conveyed by said conveyer part, and said controller instructs a driving part to drive at a first interval when the temperature measured by said temperature sensor is higher than a predetermined temperature, and at a second interval longer than said first interval when the temperature measured by said temperature sensor is lower than said predetermined temperature.

4. An automatic transaction apparatus according to claim 1, wherein said conveyer part comprises:

a driven part which is engaged with and conveys said transaction medium; and a driving part which drives said driven part, wherein said controller instructs said driving part to run said driven part at idle for a predetermined period when the temperature measured by said temperature sensor is lower than a predetermined temperature.

5. An automatic transaction apparatus according to claim 1, wherein said transaction medium has a paper form, said conveyer part conveys said transaction medium one after another, said automatic transaction apparatus further comprises a storing part which stores said transaction medium, wherein said conveyer part comprises:

a driven part which dispenses said transaction medium from said storage part; and a driving part which drives said driven part and has a first speed and a second speed lower than said first speed, wherein said controller instructs said driving part to drive said driven part in said first speed when the temperature measured by said temperature sensor is higher than a predetermined temperature, and in said second speed when the temperature measured by said temperature sensor is lower than said predetermined temperature.

6. An automatic transaction apparatus according to claim 1, wherein said transaction medium has a paper form, wherein said conveyer part conveys said transaction medium one after another, wherein said automatic transaction apparatus further comprises a storing part which stores said transaction medium, wherein said conveyer part comprises a driven part which dispenses said transaction medium from said storage part and a driving part which drives said driven part, and wherein said controller instructs said driven part to dispense said transaction medium at a first dispensing interval when the temperature measured by said temperature sensor is higher than a predetermined temperature, and at a second dispensing interval longer than said first dispensing interval when the temperature measured by said temperature sensor is lower than said predetermined temperature.

7. An initial operation control method for an automatic transaction apparatus comprising:

activating said automatic transaction apparatus which carries out transactions utilizing a transaction medium according to transaction information;

measuring a temperature of a conveyer part capable of conveying said transaction medium one by one;

running said conveyer part at a first speed, with a first dispensing interval independent of the first speed, when the temperature of said conveyer part is higher than a predetermined temperature; and running said conveyer part at a second speed lower than said first speed, and with a second dispensing interval independent of the second speed and lower than said first dispensing interval when the temperature of said conveyer part is lower than said predetermined temperature.

8. An initial operation control method for an automatic transaction apparatus according to claim 7, further comprising:

running idle said conveyer part for a first period when the temperature of said conveyer part is higher than a predetermined temperature; and running idle said conveyer part for a second period longer than said first period when the temperature of said conveyer part is lower than said predetermined temperature.

9. A control method of an automatic transaction apparatus wherein said automatic transaction apparatus comprises a processing part which handles transaction information and a transaction medium, a conveyer part which conveys said transaction medium one by one corresponding to said transaction information, and a dispensing part which dispenses said transaction medium to the conveyer part, said control method comprising:

measuring a temperature of said conveyer part; and independently controlling a conveyed speed of the transaction medium by the conveyer part and an interval to dispense the transaction medium one by one by the dispensing part according to said measured temperature.

10. An automatic transaction apparatus, comprising:

a temperature sensor that measures a temperature; and a dispenser that conveys and dispenses a transaction medium one by one at an independently adjustable speed and interval responsive to the temperature.

11. The automatic transaction apparatus of claim 10, further comprising a bill recycler that stores a transaction medium inserted one by one, for future use.

12. The automatic transaction apparatus of claim 1, further comprising a bill recycling unit that stores a transaction medium inserted one by one, for future use.

13. The automatic transaction apparatus of claim 10, further comprising a deposited money pool that holds a deposited transaction medium so that the controller can control the conveyed speed of the transaction medium and an interval to dispense the transaction medium one by one.

14. The automatic transaction apparatus of claim 1, further comprising a deposited money pool that holds a deposited transaction medium so that the controller can control the conveyed speed of the transaction medium and an interval to dispense the transaction medium one by one.

* * * * *

UNITED STATES PATENT AND TRADEMARK OFFICE

CERTIFICATE OF CORRECTION

PATENT NO. : 6,536,662 B1
DATED : March 25, 2003
INVENTOR(S) : Seiich Ohno

It is certified that error appears in the above-identified patent and that said Letters Patent is hereby corrected as shown below:

Title page,
Item [30], Foreign Application Priority Data, change "January 6, 1999" to -- June 1, 1999 --.

Signed and Sealed this

Fifth Day of August, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,536,662 B1
DATED : March 25, 2003
INVENTOR(S) : Seiich Ohno

It is certified that error appears in the above-identified patent and that said Letters Patent is hereby corrected as shown below:

<u>Title page</u>,
Item [75], Inventor, change "Seiich" to -- Seiichi --.

Signed and Sealed this

Second Day of March, 2004

JON W. DUDAS
*Acting Director of the United States Patent and Trademark Office*